US006142921A

United States Patent [19]

Wakat

[11] Patent Number: 6,142,921
[45] Date of Patent: *Nov. 7, 2000

[54] APPARATUS AND METHOD FOR PRODUCING A ROLLER

[75] Inventor: George H. Wakat, St. Paul Park, Minn.

[73] Assignee: Wagner Spray Tech Corporation, Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/968,197

[22] Filed: Nov. 12, 1997

Related U.S. Application Data

[60] Provisional application No. 60/030,586, Nov. 12, 1996.

[51] Int. Cl.[7] .................... B23P 15/00
[52] U.S. Cl. .................... 492/13; 15/230.11
[58] Field of Search .................... 492/13, 47; 15/230.11

[56] References Cited

U.S. PATENT DOCUMENTS

| | | | |
|---|---|---|---|
| Re. 29,311 | 7/1977 | Ritter . | |
| D. 220,850 | 6/1971 | Davis | D64/18 |
| D. 230,086 | 1/1974 | Meisner . | |
| 2,321,511 | 6/1943 | Piercy . | |
| 2,693,893 | 11/1954 | Rice . | |
| 2,799,884 | 7/1957 | Bedford . | |
| 2,881,461 | 4/1959 | Parker . | |
| 3,102,327 | 9/1963 | Wiegand | 29/116 |
| 3,554,659 | 1/1971 | Stokes . | |
| 3,649,986 | 3/1972 | Dahlund . | |
| 3,711,887 | 1/1973 | Chapman . | |
| 3,745,624 | 7/1973 | Newman | 29/116 R |
| 3,970,396 | 7/1976 | Brady . | |
| 4,000,537 | 1/1977 | Woo . | |
| 4,102,468 | 7/1978 | Goldman | 220/69 |
| 4,191,792 | 3/1980 | Janssen | 427/260 |
| 4,201,801 | 5/1980 | Hori . | |
| 4,257,140 | 3/1981 | Downing . | |
| 4,404,703 | 9/1983 | Woodall . | |
| 4,434,521 | 3/1984 | Martin et al. | 15/230.11 |
| 4,467,509 | 8/1984 | Dezen | 29/116 R |
| 4,630,952 | 12/1986 | Elbaum . | |
| 4,872,236 | 10/1989 | Thompson . | |
| 4,897,893 | 2/1990 | Barker | 15/230.11 |
| 4,930,179 | 6/1990 | Wright . | |
| 4,937,909 | 7/1990 | Georgiou | 15/230.11 |
| 5,117,529 | 6/1992 | Ohta | 15/230.11 |
| 5,167,055 | 12/1992 | Stoddart et al. | 29/110.5 |
| 5,178,274 | 1/1993 | Long | 206/361 |
| 5,206,979 | 5/1993 | Campbell | 492/13 |
| 5,386,611 | 2/1995 | Kim . | |
| 5,412,832 | 5/1995 | Irven . | |
| 5,437,593 | 8/1995 | Gustavsen . | |
| 5,471,703 | 12/1995 | Niven | 15/230.11 |
| 5,473,791 | 12/1995 | Holcomb . | |
| 5,539,948 | 7/1996 | McCauley . | |
| 5,571,562 | 11/1996 | Wakat | 427/280 |
| 5,577,291 | 11/1996 | Myers . | |

FOREIGN PATENT DOCUMENTS

| | | |
|---|---|---|
| 9002017 | 4/1991 | Netherlands . |

OTHER PUBLICATIONS

Harrington, L. et al., "Color : A Stroke of Brilliance; A Guide to Color & Decorating with Paint", *Benjamin Moore & Co.*, Montvale, N.J., 104–107, (1993).

*Primary Examiner*—I. Cuda
*Attorney, Agent, or Firm*—Faegre & Benson, LLP

[57] ABSTRACT

A roller cover has a backing. A nap, which holds the paint, is attached to said backing. The nap further comprises threads for holding paint. The threads are agglomerated or connected to one another at the distal end of said threads. This produces the sponged on paint look when the roller is used to apply paint to a wall. The agglomerated or connected threads are produced by applying heat from a heat source such as a torch or hot plate, to a synthetic fiber.

7 Claims, 3 Drawing Sheets

APPARATUS AND METHOD FOR PRODUCING A ROLLER

RELATED APPLICATION

This application claims the benefit of U.S. Provisional patent application Ser. No. 60/030,586 filed Nov. 12, 1996 under 35 USC 119(e).

FIELD OF THE INVENTION

This invention relates generally to painting and more specifically to painting with a roller.

BACKGROUND OF THE INVENTION

Previously, to produce a sponged paint look with paint a real sponge was dipped in paint and then the real sponge was blotted to remove excess paint. Once the excess paint was removed, the real sponge was repeatedly placed into contact with a wall until the remaining paint was gone. The process was repeated over and over until the entire wall was covered. This was time consuming since a base core had to be rolled on before the sponge could be applied to the wall. Due to the time involved, usually a limited number of paint colors were sponged onto the wall.

There is a need for an apparatus and method for applying paint to the wall to produce the sponged paint effect. There is also a need for a method and apparatus for applying multiple colors quickly to a surface to be painted.

SUMMARY OF THE INVENTION

A roller cover for a paint roller is treated so that it produces a pattern similar to the pattern produced by repeatedly applying a sponge to the surface to be painted. The roller cover can then be used on a roller to roll the paint onto the wall. This provides for a quicker application of paint. Multiple rollers can then be used to apply multiple colors. The same roller could be cleaned between colors and used again to apply another color. The roller cover has a backing. A nap, which holds the paint, is attached to said backing. The nap further comprises threads for holding paint. The threads are agglomerated or connected to one another at the distal end of said threads. This produces the sponged on paint look when the roller is used to apply paint to a wall. The agglomerated or connected threads are produced by applying heat from a heat source such as a torch or hot plate, to a synthetic fiber. Portions of the nap may also be removed or patterned before applying heat from the heat source to agglomerate the threads of the nap.

DESCRIPTION OF PREFERRED EMBODIMENT

In the following detailed description of the preferred embodiment, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
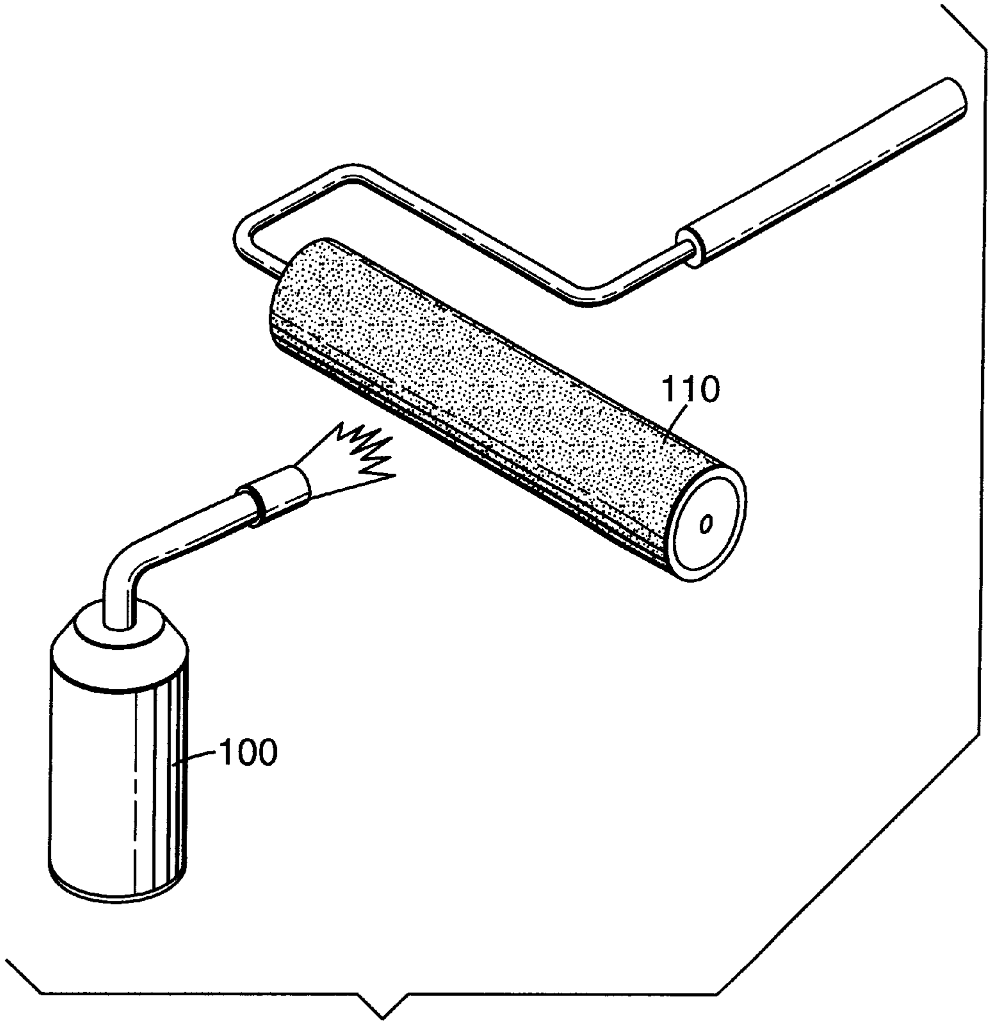
FIG. 1 is a perspective drawing of a roller cover being treated with a torch.
Figure 4:
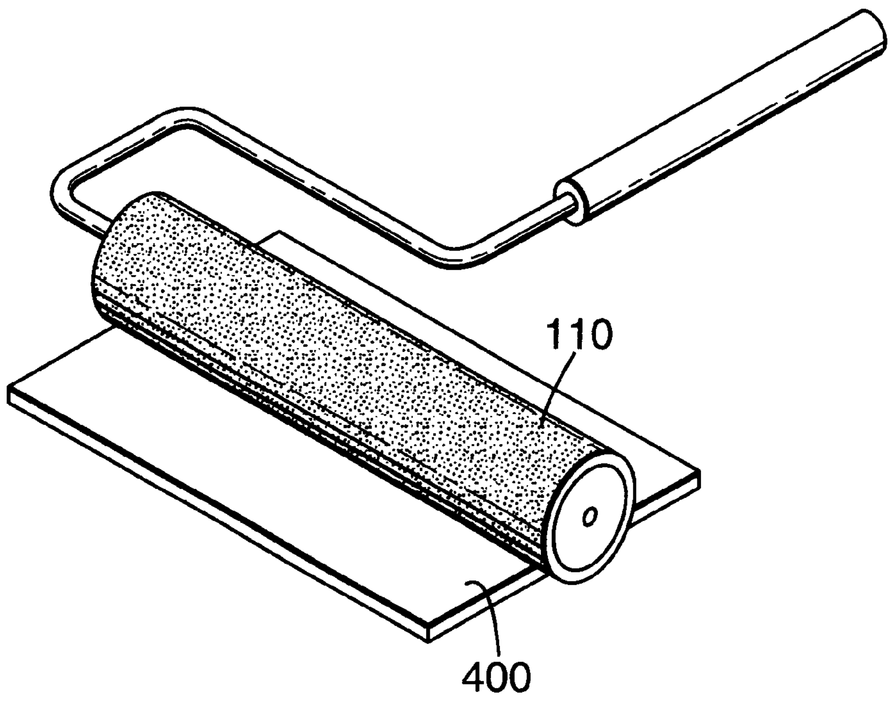
FIG. 4 is a perspective drawing of a roller cover being treated with a heated plate.

As shown in FIGS. 1 and 4, by using a torch 100 or embossing flat plate 400 at around 600° F. and placing it close to a standard synthetic nap roller cover 110, you cause the nap to droop and melt together. A synthetic applicator material or roller material, such as nylon, rayon, polyester, must be used because they are heat sensitive before they burn. By taking synthetic roller applicators and spinning them on a mandrel while at the same time applying heat to the ends of the fibers, the fibers agglomerate and fuse with each other. Melting in differing amounts results in different spatter effects on the wall with paint, from a salt-and-pepper look to a crackle paint effect (spatter and linear marks).

The length of nap and type will vary the pattern. How long the heat is applied and how evenly will also affect the pattern. A long "nap 1" cover works the best to cause even distribution of the gathered fibers. Shielding a part of the nap results in other patterns.

Figure 2:
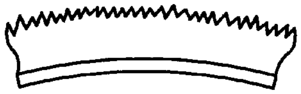
FIG. 2 is a cutaway view of a roller prior to heat treatment.
Figure 3:
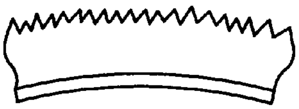
FIG. 3 is a cutaway view of a roller with agglomerated threads after heat treatment.

Once the agglomeration is done, the roller will soak up paint differently. Extra heavy melting means you need thinner paint to load the roller through the melted fibers. FIG. 3 shows a roller with agglomerated or connected fibers. FIG. 2 shows a nap before heat treatment.

By applying subsequent coats of a different color, one can duplicate many of the commercial vinyl wall covering effects that have been popular for years and years. Chemicals can also be used to cause this to happen. The applicator can be used to make multicolor background looks for print rollers or by itself to duplicate different types of natural sponge-painting effects.

Figure 5:
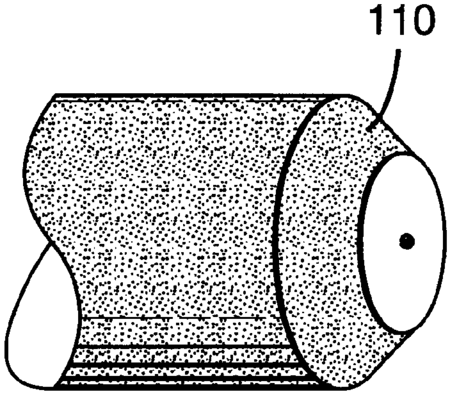
FIG. 5 is a view of a roller end having the ends of the nap melted back at an angle.

As shown in FIG. 5, to prevent edge marks at the ends of the roller core, you need to melt the fibers back at an angle to the end of the core. An angle of 45° works well. The longer the nap, the easier the roller rolls so it takes arches and curves of a rough surface better without smudging the paint because of drag on the inside of the arch by the fibers.

Figure 6:
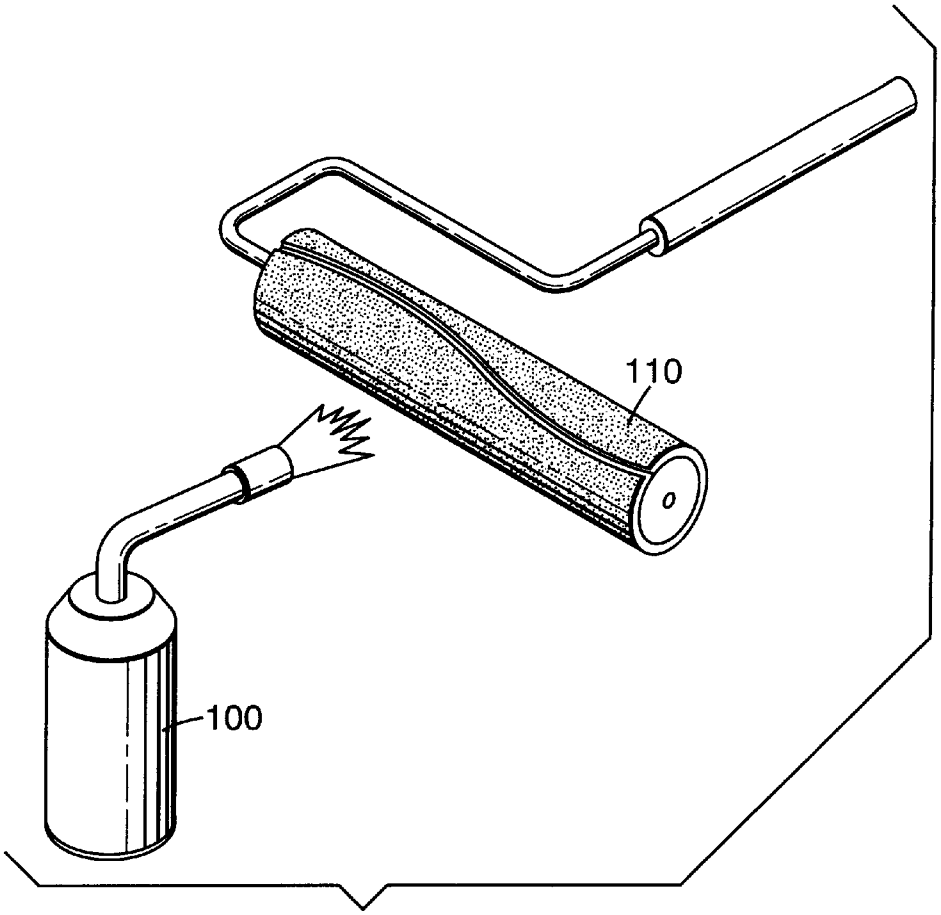
FIG. 6 is a view of a roller end with a potion of the nap removed to form a patterned nap being treated with a torch.
Figure 7:
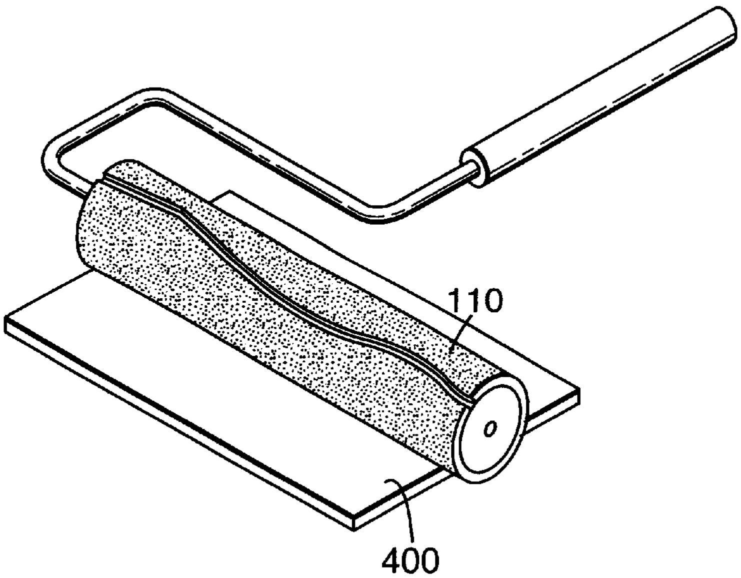
FIG. 7 is a view of a roller end with a potion of the nap removed to form a patterned nap being treated with a heated plate.

Another method to produce other patterns is to remove a portion of the nap 110 to form a patterned nap. After patterning the nap 110, the resulting roller cover is heat treated with either a torch 100 (as shown in FIG. 6) or with a heat plate 400 (as shown in FIG. 7). The threads of the roller cover agglomerate. Paint can then be applied to the resulting roller cover to produce various patterns. The patterns that are produced will depend on the patterning as well as the agglomeration of the fibers or threads of the nap 110. It should be noted that the pattern is not limited to a line for a pattern of napped removed. Any pattern could be removed from the nap 110.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A roller cover for a paint roller comprising:

a backing;

a nap attached to said backing, said nap further comprising a plurality of threads for holding paint, said threads each extending radially outward from a proximal end attached to said backing and each having a distal end away from said backing; and groups of said threads agglomerated and fused to one another only at said distal end of said threads;

such that each group of agglomerated and fused threads forms a multi-thread thickness tip at said distal end of said group of threads, said tips creating a decorative pattern on a surface to be painted when said roller cover is used to roll paint on said surface.

2. The roller cover of claim 1 wherein the threads are made of a synthetic material.

3. The roller cover of claim 1 wherein the threads include nylon.

4. The roller cover of claim 1 wherein the agglomeration and fusion is caused by heat.

5. The roller cover of claim 4 wherein the agglomeration and fusion is a result of melting the distal ends of the threads to one another.

6. The roller cover of claim 5 wherein each thread has a length and wherein the diameter of the roller cover is tapered axially at the ends of the roller cover by reducing the length of the threads around the roller cover at an angle with the length of the threads gradually becoming shorter toward the ends of the roller to prevent edge marks when using the roller cover to apply paint.

7. The roller cover of claim 1 wherein a portion of the nap is removed before the threads are agglomerated.

* * * * *